Dec. 12, 1967 KATSUMI TAKAMI 3,358,208
SYSTEM FOR CONTROL OF TEMPERATURE OF ROTORS
OF ELECTRICAL ROTARY MACHINES
Filed March 26, 1965 3 Sheets-Sheet 1

INVENTOR
KATSUMI TAKAMI
BY
H. Edward Masters

INVENTOR
KATSUMI TAKAMI
BY
H. Edward Mestern

United States Patent Office 3,358,208
Patented Dec. 12, 1967

3,358,208
SYSTEM FOR CONTROL OF TEMPERATURE OF ROTORS OF ELECTRICAL ROTARY MACHINES
Katsumi Takami, Koganei-shi, Japan, assignor to Kabushiki Kaisha Hitachi Seisakusho, Tokyo-to, Japan, a joint-stock company
Filed Mar. 26, 1965, Ser. No. 443,143
Claims priority, application Japan, May 31, 1964, 39/17,604
3 Claims. (Cl. 318—473)

This invention relates to a new system for automatically controlling temperatures of rotors of electrical rotary machines through control of electrical output quantities of the machines.

The term "control of electrical output quantities" is herein used in the sense to include controlled variation of an electrical output quantity in both a continuous manner and an intermittent or on-off manner.

The former control is widely used, for example, in the case wherein the rotational speed is varied by changing the armature resistance and field resistance, and the electrical rotary machine is caused to operate at maximum efficiency as the rotor temperature is maintained constant. The latter control is widely used in the case wherein the rotor temperature is prevented from exceeding an allowable limit temperature, and when the rotor temperature approaches this limit temperature, this state is indicated.

In an electrical rotary machine such as a motor or a generator, in general, the rotor temperature rises in accordance with the output power or load. The limitation of such temperature rise is determined by the allowable maximum temperature of the insulator surrounding the conductors in the rotor. However, since the ambient temperature changes with the season and factors such as the surrounding conditions, the ordinary practice in the design of such machines comprises estimating the ambient temperature at a substantially high value, for example, of 45 degrees C., to provide a margin of safety, adding this value to the temperature rise (estimated value) due to the load, and so determining the output capacity that the resulting sum value does not exceed the allowable maximum temperature of the insulators.

For this reason, the present state of the art is such that, in an ordinary electrical rotary machine only a fraction (a number of tens of percent) of the output which can be actually produced is being utilized, which state is highly disadvantageous on the point of efficiency.

It is an object of the present invention to provide a temperature control system for the purpose of operating electrical rotary machines in a highly efficient manner.

It is another object of the invention to provide a system for control of the rotor temperature comprising means to detect a signal corresponding to the rotor temperature without mechanically contacting the rotor and means to control in accordance with the detected signal the load or output in a manner to permit the rotor to operate at a preset temperature.

Still another object of the invention is to provide a system for control of the rotor temperature comprising means to detect a signal corresponding to the rotor temperature without mechanically contacting to rotor and means to sound an alarm and, at the same time, to limit the load so as to prevent overheating of the rotor when the signal so detected approaches a value corresponding to the temperature of safety limitation.

A further object of the invention is to provide a system for control of the rotor temperature comprising an LC tank circuit which is connected to the rotor, and in which a semiconductor resistance varying abruptly in resistance at a specific temperature is utilized as a temperature setting element, means to detect in a contactless manner variation of the Q value of said tank circuit from the stationary side and thereby to produce a detection signal, and means to control the rotor temperature in response to said detection signal.

Other objects and advantages of the present invention, as well as the specific nature and details thereof, will be apparent from the following detailed description taken in conjunction with the accompanying drawings in which.

Figure 1:
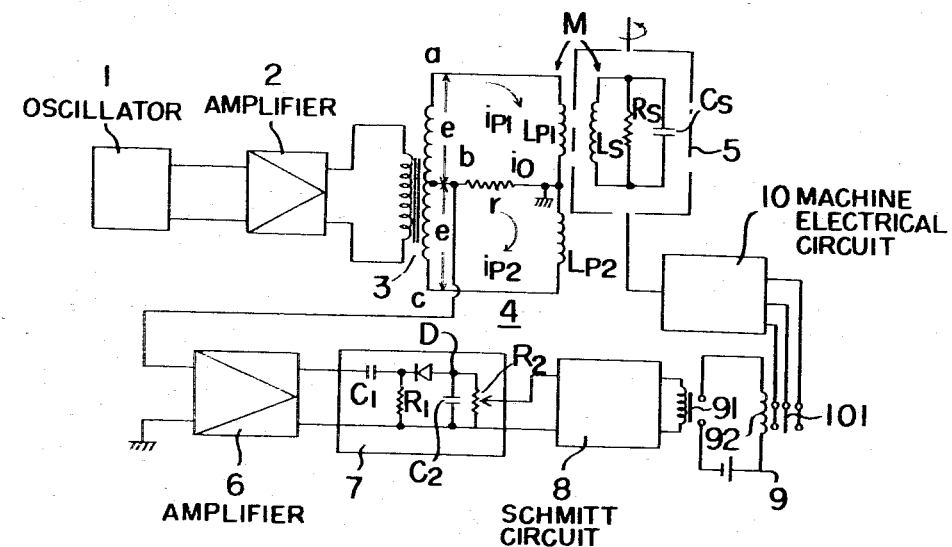
FIG. 1 is a block diagram indicating a preferred embodiment of the control system according to the invention.

Referring to FIG. 1 showing a preferred embodiment of the invention, oscillation of angular frequency $\omega$ is provided by an oscillator 1, which consists of an LC oscillator such as that of the well known Hartley type or Colpitts type or an RC oscillator. The oscillation so provided is amplified by a buffer amplifier 2 of known type, the output of which is applied across the terminals of the primary winding of a transformer 3. An exciting coil $L_{p1}$ and a balance coil $L_{p2}$ are connected in series between outer terminals $a$ and $c$ of the secondary winding of the transformer 3, and a low resistance $r$ is inserted between an intermediate tap $b$ of the secondary winding of the transformer 3 and the junction point between the coils $L_{p1}$ and $L_{p2}$.

That is, the secondary winding of the transformer 3, the coils $L_{p1}$ and $L_{p2}$, and the resistance $r$ constitute a bridge circuit 4, the balance of which is adjusted by the balance coil $L_{p2}$.

Reference numeral 5 designates the rotating structure of an electrical rotary machine such as a motor or a generator. On the outer surface of this rotating structure 5, there is mounted a tank circuit comprising a coil $L_s$ and a capacitor $C_s$ and having a resonant frequency which is independent of the rotating structure temperature. The coil $L_s$ is disposed and adapted to achieve electromagnetic coupling once per revolution with only the exciting coil $L_{p1}$ of the above mentioned bridge circuit.

A resistance $R_s$, which is connected to the tank circuit in parallel with the coil $L_s$ and capacitor $C_s$, is imbedded within the rotating structure at a point where temperature observation is considered to be particularly necessary. This resistance element $R_s$ consists of a semiconductor which abruptly changes in resistance value at a specific, critical temperature such as, for example, a positive temperature coefficient thermistor of the $BaTiO_3$ series or a negative characteristic thermistor of the vanadium series (commercial name "Critesistor," for example). The resistance-temperature characteristics of $BaTiO_3$ and vanadium thermistors are respectively indicated in FIGS. 2 and 3.

Referring again to FIG. 1, there is further provided an amplifier circuit 6 for amplifying the terminal voltage of the low resistance $r$ of the aforementioned bridge circuit 4. This amplifier circuit 6 consists of a known circuit such as that provided with transistors or vacuum tubes, and its output is applied to a smoothing circuit 7, in which the voltage passed through a coupling capacitor $C_1$ and appearing at a resistance $R_1$ is rectified by a diode D and then smoothed by a capacitor $C_2$. The resulting voltage appearing at a variable resistance $R_2$ in this smoothing circuit 7 is applied to a Schmitt circuit 8, which, as is known, is a circuit which produces an output only when an input higher and lower than a specific value is introduced thereinto (Schmitt, O. H.: "Thermionic Trigger," Jour. Sci. Inst., 15 (1938), 24).

The Schmitt circuit 8 controls an output control circuit 9 which controls the load or output of the electrical rotary machine in response to said output, and the example shown in FIG. 1 illustrates the case of intermittent control. That is, a contact 91 is closed by the ouptut current of the Schmitt circuit 8, whereby a relay coil 92 is energized to actuate in on-off operation a power source switch 101 of the electrical circuit 10 of the electrical rotary machine. The opening and closing of this power source switch 101 effects on and off control of the electrical output quantity, whereby the temperature of the rotating structure is also controlled.

According to the present invention, the means for controlling an electrical output quantity is not necessarily limited to the method set forth above. For example, the field resistance of the rotary machine may be varied by the output of the Schmitt circuit to vary the rotational speed, or the rotor resistance may be caused to vary to control an actual electrical output quantity. Thus, the means for controlling an electrical output quantity is selected to accomplish control by the optimum method depending on the type, object of use, and application of the electrical rotary machine. Moreover, such a method ordinarily can be readily realized. Furthermore, in such control, pilot lamps or the like for indicating danger due to overheating can be readily incorporated in the control system.

The system embodying the invention of the above described composition and arrangement operates in the following manner. The signal of angular frequency $\omega$ generated in the oscillator 1 is amplified in the amplifier 2 and then applied to the transformer 3, which thereupon produces a voltage $e$ between terminals $a$ and $b$ and between terminals $b$ and $c$ of its secondary winding. The resulting absorption current $i_o$ flowing through the low resistance $r$ of the bridge circuit 4 is determined by the following equation:

$$i_o = i_{p1} - i_{p2}$$

$$= \frac{d+j\left(\frac{\omega}{\omega_o}-\frac{\omega_o}{\omega}\right)}{d+j\left\{\left(\frac{\omega}{\omega_o}-\frac{\omega_o}{\omega}\right)-\frac{\omega}{\omega_o}k^2\right\}} \cdot \frac{e}{j\omega L_{p1}} - \frac{e}{j\omega L_{p1}}$$

$$= \frac{1}{\frac{d}{k^2}+j\left(\frac{1-k^2}{k^2}\frac{\omega}{\omega_o}-\frac{1}{k^2}\frac{\omega_o}{\omega}\right)} \cdot \frac{e}{\omega_o L_{p1}}$$

where:

$$k = \frac{M}{\sqrt{L_{p1} \cdot L_s}}$$

M is the mutual conductance $L_s$ and $L_{p1}$ $$d = \frac{1}{\omega_o L_s R_s} = \frac{1}{Q}$$

and $\omega_o$ = is the resonant frequency of the tank circuit.

Therefore, the absolute value $|i_o|$ of the absorption current $i_o$ is expressed by the following equation.

$$|i_o| = \frac{Qk^2}{\sqrt{1+Q^2\left\{(1-k^2)\frac{\omega}{\omega_o}-\frac{\omega_o}{\omega}\right\}^2}} \cdot \frac{e}{\omega_o L_{p1}}$$

In the case where $\omega$ is fixed according to $$\omega = \frac{\omega_o}{\sqrt{1-k^2}}$$

the above equation becomes:

$$|i_o|_{\omega=\frac{\omega_o}{\sqrt{1-k^2}}} = Q_o k^2 \frac{1}{1+\frac{\omega_o C_s}{R_s}Q_o} \cdot \frac{e}{\omega_o L_{p1}}$$

where $Q_o$ is the Q of the tank circuit without the resistance $R_s$. Then, by an arrangement whereby the quantities $Q_o$, $k$, $\omega_o$, $C_s$, $L_p$ and $e$ in the above equation undergo almost no variation with temperature, and by causing only $R_s$ to change abruptly at a specific temperature as mentioned hereinbefore, the absorption current $i_o$ can also be caused to vary abruptly in the vicinity of said specific temperature.

Figure 4:
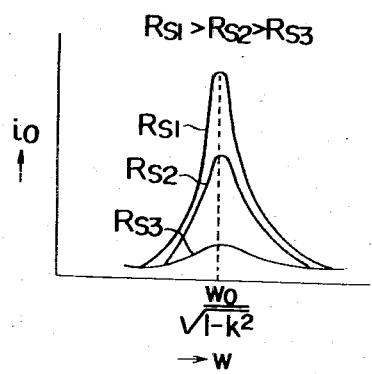
FIG. 4 is a graphical representation indicating variations due to the magnitude of $R_s$ of the absorption characteristic of a tank circuit.
Figure 5:
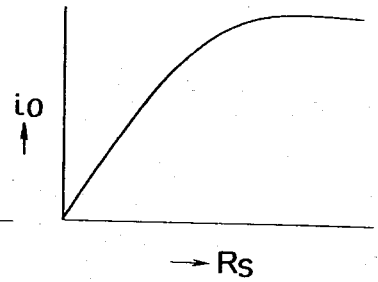
FIG. 5 is a graphical representation indicating the variation of detection current $i_0$ with respect to variation of resistance $R_s$.

FIG. 4 indicates the variation of absorption characteristics with the magnitude of the resistance $R_s$, and FIG. 5 indicates the variation of the mean value of the absorption current $i_o$ with the magnitude of the resistance $R_s$.

Figure 2:
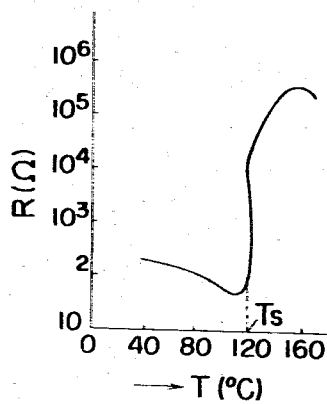
FIGS. 2 and 3 are graphical representations respectively indicating the temperature characteristics of resistance elements to be used for resistance $R_s$ in FIG. 1.

The case wherein a positive temperature coefficient thermistor as indicated in FIG. 2 is used will first be considered. When the temperature of the rotating structure 5 is lower than the value $T_s$, the resistance value of $R_s$ is very low. Accordingly, as is apparent from FIGS. 4 and 5, the value of the absorption current $i_o$ is also low. Consequently, the voltage ($=i_o r$) detected by the bridge circuit 4 assumes a very low value as indicated in the region of $t<t_o$ in FIG. 6.

Figure 7:
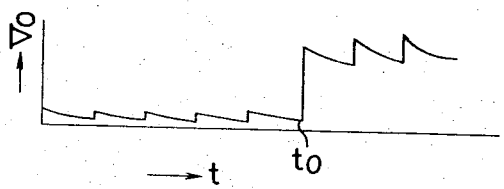
FIG. 7 is a waveform diagram of detection voltage $i_0 r$ when it is successively amplified, rectified, and smoothed.

This signal voltage is amplified by the amplifier 6 and smoothed in the smoothing circuit 7 to assume the form indicated in FIG. 7 and appear at the terminals of the resistance $R_2$, but this voltage does not cause the Schmitt circuit 8 to operate.

Figure 6:
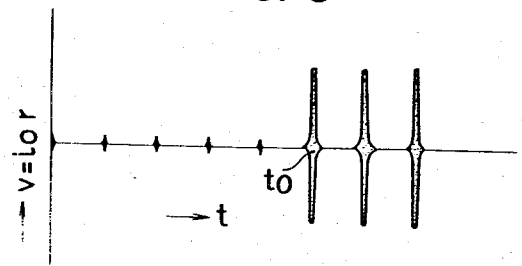
FIG. 6 is a waveform diagram of detection voltage $i_0 r$ with respect to time.

Then, when the temperature of the rotating structure 5 exceeds the set temperature $T_s$ at a time instant $t_o$, the resistance value of $R_s$ increases abruptly, and the voltage across the terminals of the resistance $r$ increases with time as indicated in the region of $t>t_o$ in FIG. 6. Consequently, the voltage $V_o$ between the terminals of the resistance $R_2$ assumes the form indicated in FIG. 7 and causes the Schmitt circuit 8 to operate and produce a specific output, which activates the control circuit 9.

In the case where the prime object is to prevent overheating of the rotating structure 5, the resistance element $R_s$ is so selected that the above mentioned temperature $T_s$ coincides with the allowable maximum temperature of the rotating structure. Accordingly, when the rotating structure temperature exceeds the value $T_s$, the relay 9 is caused to operate by the output of the Schmitt circuit 8, thereby to open the power source switch 101 of the electrical rotary machine.

In the case where the machine is to be operated in a manner such that the temperature of the rotating structure is maintained at a selected value $T_A$, a resistance element $R_s$ whose resistance value changes abruptly at the temperature $T_A$ is selected. Then the output of the Schmitt circuit is used to control a factor such as, for example, the armature resistance or the field resistance, which is capable of controlling the load or output of the electrical rotary machine. Although a specific example of a circuit for this purpose is not shown in FIG. 1, such a circuit can be readily arranged.

While the set temperature $T_s$ in this case varies with the abrupt variation point of the resistance value, this point can be adjustably varied at will in the range between 50 and 120 degrees C. by adding $SrTiO_3$ to a thermistor element of the $BaTiO_3$ series and in the range between 120 and 220 degrees C. by adding $PbTiO_3$. Thus, a resistance element suitably corresponding to the set temperature can be readily prepared.

According to the present invention as described above, since the machine can be operated with the rotating structure constantly at a specified temperature, it is possible to obtain a very high efficiency and, moreover, to prevent damage due to overheating.

Figure 3:
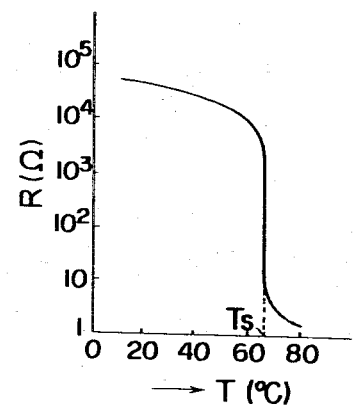

While the above described example relates to the case where a positive temperature coefficient thermistor is used for the resistance $R_s$, a negative temperature coefficient thermistor having a characteristic as indicated in FIG. 3 can also be used. In this case, a circuit which produces an output only when an input of a specific voltage or lower voltage enters thereinto may be used for the circuit 8 to cause the same control operation as described above. An alternative method is to connect the coil $L_s$, capacitor $C_s$, and resistance $R_s$ in series to produce the same operation as in the case where a positive temperature coefficient thermistor is connected in parallel.

Furthermore, while in the above described example, a single tank circuit is mounted on the rotating structure 5, it is also possible to mount a plurality of tank circuits on the peripheral surface of the rotating structure in an arrangement such that the respective coils of these tank circuits are successively coupled with the coil $L_{p1}$ as the rotating structure rotates. By such an arrangement, it is possible to detect the temperatures at a plurality of different points in the rotating structure. In this case, the Schmitt is caused to operate when the temperature at one of the monitoring points exceeds a specific temperature.

Figure 8:
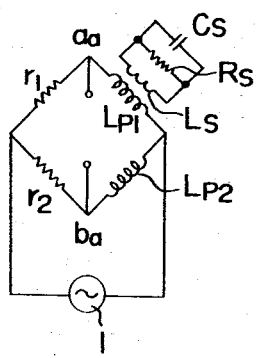
FIGS. 8 and 9 are circuit diagrams respectively showing examples of circuits for detecting variation of the resistance $R_s$.

The bridge circuit 4 is for detecting variation in the Q value of the tank circuit due to temperature variation and is not necessarily limited to the circuit arrangement shown in FIG. 1. For example, a bridge may be formed of resistances $r_1$ and $r_2$ and coils $L_{p1}$ and $L_{p2}$ as shown in FIG. 8, the coil $L_s$ of a tank circuit and the coil $L_{p1}$ being electromagnetically coupled, thereby to obtain a voltage between nodes $a_a$ and $b_a$ of the bridge circuit.

Figure 9:
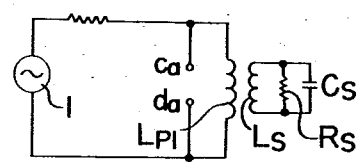

Furthermore, another alternative arrangement is that shown in FIG. 9, wherein the exciting coil $L_{p1}$ to be coupled with the coil $L_s$ is driven by a constant current by means of the oscillator 1, and the voltage between points $c_a$ and $d_a$ is detected.

In some cases, when the rotating structure once assumes a temperature state above a set temperature, and the switch of the power source for the machine has been opened, it is desired to maintain this state. In such a case, a self holder such as a bistable multivibrator may be connected in the latter stage of the Schmitt circuit 8, the power source switch then being opened and closed by the output of the self holder.

As described above, since by the practice of the present invention the temperature of the rotating structure of an electrical rotary machine is directly measured, and the output or load of the machine is so controlled that this temperature coincides with a specified temperature, it is not necessary to use a high safety factor irrespective of conditions such as possible variations in the ambient temperature. Therefore, the machine can be operated to produce an output in the vicinity of its maximum output capacity.

Furthermore, only a simple passive circuit of miniature size and light weight is used for measurement of the temperature of the rotating structure, the temperature measurement element being utilized for direct temperature measurement, and, moreover, deviations of the measured temperature from a predetermined temperature are detected in a simple and contactless manner as variations in the Q value of a tank circuit. Therefore, even in the case of a rotary machine entailing high centrifugal force, temperature control or protection from overheating can be accomplished in a simple and inexpensive manner.

It should be understood, of course, that the foregoing disclosure relates to only a preferred embodiment of the invention and a few modifications thereof and that it is intended to cover all changes and modifications of the example of the invention herein chosen for the purposes of the disclosure, which do not constitute departures from the spirit and scope of the invention as set forth in the appended claims.

What I claim is:

1. A system for control of temperature in an electrical rotary machine such as an electric motor or generator having a rotating structure and a stationary structure, said system comprising an oscillator for generating a signal of a specific frequency, a tank circuit mounted on said rotating structure and comprising a coil and a capacitor which have both very low temperature coefficient, a resistance element connected to the tank circuit and embedded in a part of the rotating structure the temperature of which part is to be measured, said resistance element having a characteristic whereby its resistance value changes abruptly at a specific temperature, an exciting coil fixed to said stationary structure in a manner to be coupled electromagnetically with said coil of the tank coil mounted on the rotating structure, means to apply said signal generated by the oscillator to the exciting coil, means to detect absorption of the tank circuit accompanying variation in said temperature of the rotating structure thereby to produce a detected absorption signal, and means to control an electrical output quantity of the electrical rotary machine in accordance with said detected absorption signal.

2. A system for control of temperature in an electrical rotary machine such as an electric motor or generator having a rotating structure and a stationary structure, said system comprising an oscillator for generating a signal of a specific frequency, a tank circuit mounted on said rotating structure and comprising a coil and a capacitor which have both very low temperature coefficient, a resistance element connected to the tank circuit and embedded in any selected part of the rotating structure, said resistance element having a resistance value which changes abruptly at a specific temperature, an exciting coil fixed to said stationary structure in a manner to be coupled electromagnetically with said coil of the tank circuit, means to apply said signal generated by the oscillator through a fixed resistance element to the exciting coil, means to amplify variation of the terminal voltage of said fixed resistance element accompanying variation of temperature of the rotating structure thereby to produce an amplified output, means to rectify and smooth said amplified output thereby to produce a smoothed signal, a Schmitt circuit producing an output only when its input exceeds a specific value, means to apply said smoothed signal as input to the Schmitt circuit, and relay means to open and close the power source switching means of the electrical rotary machine in accordance with said output of the Schmitt circuit.

3. A system for control of temperature in an electrical rotary machine such as an electric motor or generator having a rotating structure and a stationary structure, said system comprising an oscillator for generating a signal of a specific frequency, a tank circuit mounted on said rotating structure and comprising a coil and a capacitor which have both very low temperature coefficient, a resistance element connected to the tank circuit and embedded in any selected part of said rotating structure, said resistance element having a resistance value which changes abruptly at a specific temperature, an exciting coil fixed to said stationary structure in a manner to be coupled electromagnetically with said coil of the tank circuit, means to divide said signal generated by the oscillator into two outputs and pass said outputs through a common fixed resistance element, whereby one of said outputs will be applied to the exciting coil and the other to a balance coil, means to detect voltage variation between the terminals of said fixed resistance element accompanying variation of temperature of the rotating structure thereby to produce a detection signal, and means to control an electrical output quantity of the electrical rotary machine in accordance with said detection signal.

References Cited

UNITED STATES PATENTS

| | | | |
|---|---|---|---|
| 3,262,014 | 7/1966 | Conner | 318—473 X |
| 3,268,768 | 8/1966 | Milligan et al. | 318—473 X |
| 3,305,698 | 2/1967 | Bargen et al. | 318—473 X |

ORIS L. RADER, *Primary Examiner.*

B. A. COOPER, *Assistant Examiner.*